United States Patent [19]

Furukawa et al.

[11] Patent Number: 5,264,473

[45] Date of Patent: Nov. 23, 1993

[54] POLYVINYL CHLORIDE BASED RESIN COMPOSITION

[75] Inventors: Hiroaki Furukawa; Kazuyasu Higashiyama; Kentaro Iwanaga; Yasumi Tanaka; Tadashi Usuki; Koji Tanaka; Shinsuke Toyomasu, all of Mie, Japan

[73] Assignee: Tosoh Corporation, Yamaguchi, Japan

[21] Appl. No.: 697,365

[22] Filed: May 9, 1991

[30] Foreign Application Priority Data

| May 10, 1990 [JP] | Japan | 2-118817 |
|---|---|---|
| Jun. 8, 1990 [JP] | Japan | 2-148636 |
| Jun. 28, 1990 [JP] | Japan | 2-168438 |

[51] Int. Cl.$^5$ .............................................. C08K 5/52
[52] U.S. Cl. .................................... 524/127; 524/296
[58] Field of Search ............................... 524/127, 296

[56] References Cited

U.S. PATENT DOCUMENTS

| 2,500,891 | 4/1950 | Alexander. | |
|---|---|---|---|
| 2,502,371 | 3/1950 | Darby. | |
| 2,557,089 | 6/1951 | Gamrath et al. . | |
| 2,831,824 | 4/1958 | White | 524/127 |
| 3,842,027 | 10/1974 | Richardson | 524/296 |
| 4,098,753 | 7/1978 | Tsigdinos et al. | 524/296 |
| 4,343,732 | 8/1982 | Zama et al. | 524/127 |
| 4,670,494 | 6/1987 | Semenza | 524/406 |

OTHER PUBLICATIONS

Patent Abstracts of Japan, Abstract of JP-A-59113046.

*Primary Examiner*—Joseph L. Schofer
*Assistant Examiner*—Peter Mulcahy
*Attorney, Agent, or Firm*—Sughrue, Mion, Zinn, Macpeak & Seas

[57] ABSTRACT

Polyvinyl chloride based resin compositions improved in the vibrational energy absorbing ability are disclosed. The compositions comprise a specific class of phthalic acid esters and a specific class of phosphori acid esters. Articles formed of the compositions are also disclosed.

16 Claims, No Drawings

POLYVINYL CHLORIDE BASED RESIN COMPOSITION

BACKGROUND OF THE INVENTION

This invention relates to polyvinyl chloride based resin compositions having such an excellent ability to absorb vibrational energy that they are suitable for use in various applications including transportation equipment, precision electronic devices and acoustic devices. Through effective control of vibrations, the compositions are capable of improving the response speed of transportation equipment, increasing the precision of measurement with electronic devices and enhancing the sound quality and comfort of acoustic devices.

Butyl rubbers have been used most extensively as materials to absorb vibrational energy. Recently, polynorbornene rubbers and specialty urethane based elastomers have been found to have better performance and drawn the attention of researchers. The evaluation of these material for absorbing vibrational energy is primarily performed in terms of the storage modulus (E') and loss tangent [tan $\delta$ = loss modulus (E")/storage modulus (E')] that are determined by measuring their viscoelastic properties.

For designing successful vibration absorbing materials, their loss tangent is preferably as high possible whereas the storage modulus has an optimum value depending on the form in which they are used. These two factors usually have high dependency on temperatures. The storage modulus decreases gradually with increasing temperature and decreases sharply at certain temperatures, typically beyond the glass transition point. On the other hand, the loss tangent shows the highest value at temperatures slightly beyond the glass transition point and tends to decrease at lower or much higher temperatures.

Under the circumstances, the first criterion for successful vibration absorbing materials has been that they have high loss tangents in the temperature range in which they are used. As for the storage modulus, it has been possible to attain an optimum value since adjustments can be effected over a considerably broad range by addition of inorganic or metallic fillers, softening agents, rubber, etc. As a result, butyl rubbers, polynorbornene rubbers and specialty urethane based elastomers have attained excellent loss tangents (tan $\delta$) that are respectively 1.4, 2.8 and 1.3 at maximum. However, these materials have found only limited use because of their relatively low processability and formability.

The recent demands for higher performance and quality of precision electronic devices and various transportation equipment including automobiles are growing every year and it is required today that the value of loss tangent (tan $\delta$) be high not only in a specified temperature range but also in a broad temperature range of from room temperature to near 60° C., or even from $-20°$ C. to near 100° C. depending on use.

Polyvinyl chloride resins have long been used as a class of general-purpose resins and not only their economy but also practically all of the methods of shaping and processing them have been established. As other advantages, they are noncrystalline resins and permit easy production of composites with inorganic or metallic fillers or softening agents.

Polyvinyl chloride alone has a loss tangent that peaks at about 1.1 at temperatures of ca. 90° C. If di-2-ethylhexyl phthalate (hereinafter abbreviated as DOP) which is a typical plasticizer is added in an amount of 100 parts by weight per 100 parts by weight of the resin, the peak temperature of the resin's loss tangent will drop to ca. 5° C. and at the same time the peak value of the loss tangent also drops to ca. 0.7. It has heretofore been held that this phenomenon is due to the broadening of the distribution of relaxation time that occurs as a result of the entrance of a dissimilar molecule into the moleculecular chain of polyvinyl chloride per se. However, the recent studies of the present inventors have revealed that when a very limited class of plasticizers typified by dicyclohexyl phthalate are added to polyvinyl chloride, the peak temperature of its loss tangent decreases and yet the peak value of loss tangent rises to ca. 1.6. A fatal problem with this approach is that bleeding occurs if more than 70 wt. % of dicyclohexyl phthalate is added independently to polyvinyl chloride or even if it is added in an amount of less than 30 wt. % an admixture with DOP.

Foams are extensively used as abosrbents, particularly for absorbing vibrational impacts and polyvinyl chloride paste resins are used most commonly in this area of applications. However, polyvinyl chloride paste resins are typically used as sol after being mixed with liquid plasticizers and hence are not highly compatible with dicyclohexyl phthalate which is solid at room temperature.

SUMMARY OF THE INVENTION

An object, therefore, of the present invention is to provide a polyvinyl chloride based resin composition that retains the characteristics of polyvinyl chloride based resins and which yet exhibits excellent ability to absorb vibrational energy without experiencing bleeding even if dicyclohexyl phthalate is added.

Another object of the present invention is to provide a material for absorbing vibrational energy that retains the characteristics of polyvinyl chloride based resins and which yet has high loss tangent or maintains a relatively high loss tangent over a broad range of temperatures with reduced occurrence of bleeding.

Still another object of the present invention is to provide a foam for absorbing vibrational impacts that retains the characteristics of polyvinyl chloride based resins and which yet has excellent ablity to absorb vibrational energy without suffering from the bleeding of plasticizers.

In essence, the present invention relates to a polyvinyl chloride based resin composition that comprises a polyvinyl chloride based resin, a phthalic acid ester having the structural formula (i) shown below, and a phosphoric acid ester having the structural formula (ii) shown below. The present invention also relates to a material for absorbing vibrational energy that is comprised of said composition, as well as a foam for absorbing vibrational impacts that is comprised of said composition:

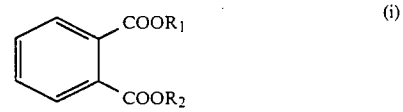

where $R_1$ and $R_2$ which may be the same or different each represents a monocyclic hydrocarbon group;

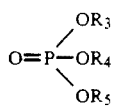

where $R_3$, $R_4$ and $R_5$ which may be the same or different each represents an aromatic monocyclic hydrocarbon group.

In other aspects, the present invention relates to a material for absorbing vibrational energy, as well as a foam for absorbing vibrational impacts that comprise a polyvinyl chloride based resin, a petroleum resin and a plasticizer, said petroleum resin being contained in an amount of 3-200 parts by weight per 100 parts by weight of the polyvinyl chloride based resin.

DETAILED DESCRIPTION OF THE INVENTION

The term "polyvinyl chloride based resin" as used herein means not only a homopolymer of vinyl chloride but also any other resins that are generally recognized as a class of polyvinyl chloride based resins including copolymers of vinyl chloride with vinyl acetate and ethylene, graft polymers of vinyl chloride with an ethylene-vinyl acetate copolymer or polyurethane, and polyvinyl chloride paste resins. For obtaining foams, polyvinyl chloride paste resins that are used in wall paper and cushion floors are particularly preferred.

The phthalic acid ester having the structural formula represented by (i) is such a compound that $R_1$ and $R_2$ which may be the same or different each represents a monocyclic hydrocarbon group such as one having 3-8 carbon atoms, with one having 6 carbon atoms being particularly preferred. The hydrogen atoms on the ring may be replaced by other substituents.

Specific examples of the phthalic acid ester of the formula (i) include dicyclohexyl phthalate (DCHP), dimethylcyclohexyl phthalate (DMCHP) and diphenyl phthalate (DPP), with dicyclohexyl phthalate being preferred. From the view points of processability and economy, the phthalic acid ester is preferably added in an amount of 5-200 parts, more preferably from 10 to 100 parts by weight, per 100 parts by weight of the polyvinyl chloride based resin. Polyvinyl chloride taken alone shows a maximum tan $\delta$ value of 1.1 at ca. 90° C. in a dynamic viscoelasticity measurement at a frequency of 10 Hz; if the phthalic acid ester is added in an amount of 5-200 parts by weight, the maximum value of tan $\delta$ changes from ca. 1.4 to 1.8 at temperatures in the range of ca. 30°-80° C. The theory of relaxation suggests that this phenomenon is probably due to the increased uniformity in the internal state of the material of interest, which narrows the distribution of relaxation time. However, it is not clear why the phthalic acid ester having the structural formula (i) is specifically superior to other phthalic acid esters.

The phosphoric acid ester having the structural formula represented by (ii) is such a compound that $R_3$, $R_4$ and $R_5$ which may be the same or different each represents an aromatic monocyclic hydrocarbon group, such as one having 6-9 carbon atoms, with a phenyl group having a substituent being particularly preferred. The hydrogen atoms on the ring of each R may be replaced by other substituents.

Specific examples of the phosphoric acid ester of the formula (ii) include tricresyl phosphate (TCP) and trixylenyl phosphate (TXP). Trixylenyl phosphate is particularly preferred since it has the advantage that even if it is added independently to the polyvinyl chloride based resin, the latter retains a maximum tan $\delta$ of ca. 1.1.

From the viewpoints of processability and economy, the phosphoric acid ester is preferably added in an amount of 5-200 parts by weight, more preferably from 10 to 100 parts by weight, per 100 parts by weight of the polyvinyl chloride based resin. The bleeding of the phthalic acid ester can be significantly suppressed by adding at least 5 parts by weight of the phosphoric acid ester.

The temperature at which the resin composition of the present invention exhibits a maximum value of tan $\delta$ can be adjusted over a broad range from room temperature to a point in the neighborhood of 80° C. by controlling the proportions of the phthalaic acid ester and the phosphoric acid ester. Further, the resin composition can retain a tan $\delta$ of at least 1.2 and hence it may well be considered to be a material that is very effective for the purpose of absorbing vibrational energy.

The petroleum resin to be used in the present invention is one that is obtained by polymerizing a mixture of $C_5$-$C_9$ olefins. The addition of the petroleum resin contributes to a significant enhancement of the maximum value of loss tangent but the degree of its effectiveness will vary considerably depending on its composition and molecular weight. Stated more specifically, a preferred petroleum resin is one that contains at least 50 wt % of indene and styrene which are $C_9$ components. More desirably, styrene is present in a larger amount than indene. It is also preferred that the petroleum resin has a number average molecular weight of 500-1,500 and outside this range, the loss tangent of the resin composition will decrease.

The petroleum resin is preferably added in an amount of 3-200 parts by weight, more preferably from 10 to 100 parts by weight, per 100 parts by weight of the polyvinyl chloride based resin. If the content of the petroleum resin is less than 3 parts by weight, it does not make much contribution to the increase in loss tangent. On the other hand, if the petroleum resin is added in an amount exceeding 200 parts by weight, the processability of the resin composition will deteriorate markedly.

The petroleum resin is certainly effective in increasing the loss tangent of the resin composition but its effectiveness will vary greatly depending upon the type of the plasticizer which is added as the third component. In other words, particularly great advantages will be attained if the plasticizer which is to be added as the third component in the present invention is selected from among those which have high miscibility with polyvinyl chloride, namely those which will increase the loss tangent of the resin composition. Examples of such desirable plasticizers include the phthalic acid ester having the structural formula (i) and the phosphoric acid ester having the structural formula (ii).

As such compounds, the phthalic acid (i) may be specifically exemplified by dicyclohexyl phthalate, dimethylcyclohexyl phthalate and diphenyl phthalate, and the phosphoric acid ester (ii) may be specifically exemplified by tricresyl phosphate and trixylenyl phosphate. The compounds having the structural formulas (i) and (ii) may be used either on their own or as admixtures.

The phthalic acid ester to be used in the present invention is low in the efficiency of plasticization, so it suffers from the disadvantage that even if it is added in a substantial amount, the temperature range where a maximum loss tangent is attained cannot be effectively lowered to room temperature and its neighborhood, which is the most common temperature range for the use of vibration absorbing materials. This defect can be compensated for by using the phosphoric acid ester in combination with the phthalic acid ester.

The amounts in which the two ester based plasticizers are added vary with the use and cannot be determined uniquely. As a guide figure, the two ester compounds are suitably used in a total amount of 5-200 parts by weight per 100 parts by weight of the polyvinyl chloride based resin. If the sum of the two ester compounds is less than 5 parts by weight, a significant enhancement of loss tangent cannot be expected. If the sum of the two ester compounds exceeds 200 parts, they will bleed to make the resin composition too sticky.

Various organic foaming agents may be added to make a foam of the resin composition and they include azodicarbonamide, azobisisobutyronitrile and 4,4'-oxybisbenzenesulfonyl hydrazide. These foaming agents are desirably added in amounts of 0.3-20 parts by weight per 100 parts by weight of the polyvinyl chloride based resin. If the addition of foaming agents is less than 0.3 parts by weight, desired foam ratios cannot be attained. On the other hand, no economic advantage will result even if foaming agents are added in amounts exceeding 20 parts by weight.

The resin composition of the present invention is capable of inhibiting the bleeding of the phthalic acid ester by using the phosphoric acid ester and, at the same time, it retains the desirable features of the polyvinyl chloride based resin. Accordingly, the resin composition of the present invention can be formed into any desired shapes by conventional forming techniques such as calendering, compression molding and injection molding that are commonly applied to polyvinyl chloride based resins. In order to make foams, a polyvinyl chloride paste resin is mixed with the two plasticizers to form a sol, which is coated over a substrate and allowed to expand in a blowing oven.

The resin composition of the present invention may incorporate, as required, fillers (e.g. calcium carbonate, talc, mica and graphite), flame retardants (e.g. antimony trioxide) and plasticizers that are commonly used with polyvinyl chloride based resins. If desired, the composition may be blended with polymeric materials such as polyvinyl acetate, ethylene-vinyl acetate copolymer and acrylonitrile-butadiene rubber that are commonly used to modify the general properties of polyvinyl chloride based resins, as well as polymeric materials such as coumarone and xylene resins that are conventionally held to be effective for the purpose of absorbing vibrational energy.

The vibration absorbing material produced by the present invention can be used as a support member for precision electronic devices, precision measuring instrument and other devices the precision of which is adversely affected by vibrations, as a sound damping or insulation member in the production line of electronic parts and other equipment that requires high precision of production, as a member for securing packings and gaskets, or as a laminated member in acoustic devices. Further, the absorbent may be directly attached to heavily vibrating sites of automobiles, industrial equipment, etc. so as to suppress vibrations, or it may be composited with wood, inorganic materials or metallic materials including stainless steel and aluminum sheets.

The foam produced by the present invention can also be sandwiched between two wood plies to produce wood floors having improved sound insulating quality.

The following examples are provided for the purpose of further illustrating the present invention but are in no way to be taken as limiting.

EXAMPLE 1

A hundred parts by weight of an ethylene-vinyl chloride copolymer resin (Ryuron E-2200 of Tosoh Corp.), 40 parts by weight of trixylenyl phosphate (TXP of Daihachi Chemical Industry Co., Ltd.), 35 parts by weight of dicyclohexyl phthalate (DCHP of Osaka Organic Chemical Industry, Ltd.) and heat stabilizers (2 parts by weight of barium stearate and 1 part by weight of zinc stearate) were mixed and kneaded in a roll mill at 170° C. to form a sheet of a resin composition within the scope of the present invention.

EXAMPLE 2

A hundred parts by weight of a polyvinyl chloride resin (Ryuron Paste R-725 of Tosoh Corp.), 100 parts by weight of trixylenyl phosphate (TXP of Daihachi Chemical Industry Co., Ltd.), 60 parts by weight of dicyclohexyl phthalate (DCHP of Osaka Organic Chemical Industry, Ltd.), 2 parts by weight of a heat stabilizer (AC-113 of Adeka Argus Chemical Co., Ltd.) and 2 parts by weight of a flame retardant antimony trioxide (ATOX-S of Nihon Seiko Co., Ltd.) were mixed and kneaded in a roll mill at 170° C. to form a sheet of a resin composition within the scope of the present invention.

EXAMPLE 3

The procedure of Example 1 was repeated except that the amounts of trixylenyl phosphate and dicyclohexyl phthalate were changed to 35 and 15 parts by weight, respectively, and that 15 parts by weight of a polyester based plasticizer (ADK CIZER PN-77 of Adeka Argus Chemical Co., Ltd.) was further added. As a result, a sheet of a resin composition within the scope of the present invention was obtained.

EXAMPLE 4

A hundred parts by weight of a vinyl chlorideurethane graft copolymer resin (DOMINAS ®K-800F of Tosoh Corp.), 10 parts by weight of trixylenyl phosphate (TXP of Daihachi Chemical Industry Co., Ltd.), 20 parts by weight of dicyclohexyl phthalate (DCHP of Osaka Organic Chemical Industry, Ltd.) and a heat stabilizer system that consisted of 1 part by weight of a liquid barium-zinc based stabilizer (6227 of Akishima Chemical Industries Co., Ltd.), 2.6 parts by weight of a particulate barium-zinc based stabilizer (6226 of Akishima Chemical Industries Co., Ltd.) and a phosphite ester based stabilizer (4342 of Akishima Chemical Industries Co., Ltd.) were mixed and processed as in Example 1 to form a sheet of a resin composition within the scope of the present invention.

COMPARATIVE EXAMPLE 1

The procedure of Example 1 was repeated except that the amounts of trixylenyl phosphate and dicyclohexyl phthalate were changed to 0 and 20 parts by weight, respectively, and that 30 parts by weight of a polyester based plasticizer (ADK CIZER PN-77 of Adeka Argus Chemical Co., Ltd.) was further added.

As a result, a sheet of a resin composition outside the scope of the present invention was obtained.

COMPARATIVE EXAMPLE 2

The procedure of Example 1 was repeated except that the amounts of trixylenyl phosphate and dicyclohexyl phthalate were changed to 0 and 20 parts by weight, respectively, and that 30 parts by weight of di-2-ethylhexyl phthalate (VINYCIZER 80 of Kao Corp.) was further added. As a result, a sheet of resin composition outside the scope of the present invention was obtained.

COMPARATIVE EXAMPLE 3

The procedure of Example 1 was repeated except that the amounts of trixylenyl phosphate and dicyclohexyl phthalate were changed to 0 and 20 parts by weight, respectively, and that 30 parts by weight of dioctyl adipate (DOA of Kurogane Kasei Co., Ltd.) was further added. As a result, a sheet of a resin composition outside the scope of the present invention was obtained.

EXAMPLE 5

A hundred parts by weight of a polyvinyl chloride resin (Ryuron TH-1000 of Tosoh Corp.), 47 parts by weight of a petroleum resin (Petcoal LX of Tosoh Corp.) that contained indene and styrene (2:3) in a total amount of 70 wt % min., 70 parts by weight of dicyclohexyl phthalate (DCHP of Osaka Organic Chemical Industry, Ltd.), 5 parts by weight of a stabilizer (OG-756 of Mizusawa Industrial Chemicals, Ltd.) and 7 parts by weight of a flame retardant antimony trioxide (ATOX-S of Nihon Seiko Co., Ltd.) were mixed and kneaded on rolls at 140° C. for ca. 5 min to form a sheet of a resin composition within the scope of the present invention.

EXAMPLE 6

Eighty-seven parts by weight of a polyvinyl chloride resin (Ryuron TH-1000 of Tosoh Corp.), 13 parts by weight of an ethylene-vinyl chloride copolymer resin (Ryuron E-2800 of Tosoh Corp.), 30 parts by weight of a petroleum resin (Petcoal LX-T of Tosoh Corp.) that contained indene and styrene (1:5) in a total amount of at least 80 wt % min., 70 parts by weight of trixylenyl phosphate (TXP of Daihachi Chemical Industry Co., Ltd.), 5 parts by weight of a stabilizer (OG-756 of Mizusawa Industrial Chemicals, Ltd.) and 7 parts by weight of a flame retardant antimony trioxide (ATOX-S of Nihon Seiko Co., Ltd.) were mixed and kneaded on rolls at 140° C. for ca. 5 min to form a sheet of a resin composition within the scope of the present invention.

EXAMPLE 7

Eighty-seven parts by weight of a polyvinyl chloride resin (Ryuron TH-1000 of Tosoh Corp.), 13 parts by weight of an ethylene-vinyl chloride copolymer resin (Ryuron E-2800 of Tosoh Corp.), 39 parts by weight of a petroleum resin (Petcoal LX-T of Tosoh Corp.), 70 parts by weight of dicyclohexyl phthalate (DCHP of Osaka Organic Chemical Industry, Ltd.), 7.5 parts by weight of di-2-ethylhexyl phthalate (VINYCIZER 80 of Kao Corp.), 27.5 parts by weight of trixylenyl phosphate (TXP of Daihachi Chemical Industry Co., Ltd.), 5 parts by weight of a stabilizer (OG-756 of Mizusawa Industrial Chemicals, Ltd.), 7 parts by weight of a flame retardant antimony trioxide (ATOX-S of Nihon Seiko Co., Ltd.) and an inorganic filler system consisting of 200 parts by weight of calcium carbonate (WHITON P-30 of Shiraishi Calcium Kaisha, Ltd.) and 40 parts by weight of mica (SUZORITE MICA 150-S of Kuraray Co., Ltd.) were mixed and kneaded on rolls at 140° C. for ca. 5 min to form a sheet of a resin composition within the scope of the present invention.

EXAMPLE 8

A hundred parts by weight of an ethylene-vinyl chloride copolymer resin (Ryuron E-2800 of Tosoh Corp.), 40 parts by weight of a petroleum resin (Petcoal LX-HS of Tosoh Corp.), 70 parts by weight of dicyclohexyl phthalate (DCHP of Osaka Organic Chemical Industry, Ltd.), 70 parts by weight of trixylenyl phosphate (TXP of Daihachi Chemical Industry Co., Ltd.), 3 parts by weight of a stabilizer (OG-756 of Mizusawa Industrial Chemicals, Ltd.), a flame retardant system consisting of 7 parts by weight of antimony trioxide (ATOX-S of Nihon Seiko Co., Ltd.) and 20 parts by weight of zinc borate (ZINC BORATE 2335 of United States Borax & Chemical Corporation), and an inorganic filler system consisting of 25 parts by weight of calcium carbonate (WHITON P-30 of Shiraishi Calcium Kaisha, Ltd.) and 10 parts by weight of mica (4K of Shiraishi Kogyo K. K.) were mixed and kneaded on rolls at 140° C. for ca. 5 min to form a sheet of a resin composition within the scope of the present invention.

EXAMPLE 9

A hundred parts by weight of a polyvinyl chloride-polyurethane graft copolymer resin (DOMINAS[R] K-800F of Tosoh Corp.), 40 parts by weight of a petroleum resin (Petcoal LX-T of Tosoh Corp.), 30 parts by weight of dicyclohexyl phthalate (DCHP of Osaka Organic Chemical Industry, Ltd.), a stabilizer system consisting of 1 part by weight of a liquid barium-zinc based stabilizer (6227 of Akishima Chemical Industries Co., Ltd.), 2.6 parts by weight of a particulate barium-zinc based stabilizer (6226 of Akishima Chemical Industries Co., Ltd.) and 0.6 parts by weight of a phosphite ester based stabilizer (4342 of Akishima Chemical Industries Co., Ltd.), and 50 parts by weight of regenerated butyl rubber were mixed and kneaded on rolls at 140° C. for ca. 5 min to form a sheet of a resin composition within the scope of the present invention.

COMPARATIVE EXAMPLE 4

A hundred parts by weight of an ethylene-vinyl chloride copolymer resin (Ryuron E-2800 of Tosoh Corp.), 100 parts by weight of di-2-ethylhexyl phthalate (VINYCIZER 80 of Kao Corp.), 6 parts by weight of a stabilizer (OG-756 of Mizusawa Industrial Chemicals, Ltd.) and 7 parts of a flame retardant antimony trioxide (ATOX-S of Nihon Seiko Co., Ltd.) were mixed and kneaded on rolls at 140° C. for ca. 5 min to form a sheet of a resin composition outside the scope of the present invention.

COMPARATIVE EXAMPLE 5

The procedure of Example 6 was repeated except that the petroleum resin was excluded from the recipe of formulation. As a result, a sheet of a resin composition outside the scope of the present invention was obtained.

COMPARATIVE EXAMPLE 6

The procedure of Example 7 was repeated except that the petroleum resin was excluded from the recipe of formulation. As a result, a sheet of a resin composition outside the scope of the present invention was obtained.

EXAMPLE 10

A resin sheet was formed by repeating the procedure of Example 1 except that 1 part by weight of a heat stabilizer zinc stearate, 6.5 parts by weight of an azo compound (AC#R, a foaming agent of Eiwa Chemical Ind. Co. Ltd.) and 4 parts by weight of a foam stabilizer (FL-21 of Adeka Argus Chemical Co., Ltd.) were added to the recipe of formulation. The rolled sheet was pressed to form a flat sheet 1 mm thick, which was expanded in a hot (200° C.) atmosphere to make a foam 5 mm thick that was within the scope of the present invention.

EXAMPLE 11

A hundred parts by weight of a polyvinyl chloride paste resin (Ryuron Paste R-725 of Tosoh Corp.), 80 parts by weight of trixylenyl phosphate (TXP of Daihachi Chemical Industry Co., Ltd.), 40 parts by weight of dimethylcyclohexyl phthalate (EDENOL 344 of Henkel Hakusui Corporation), 20 parts by weight of di-2-ethylhexyl phthalate (VINYCIZER 80 of Kao Corp.), 2 parts by weight of a flame retardant antimony trioxide (ATOX-S of Nihon Seiko Co., Ltd.), 6.5 parts by weight of an azo compound (AC#R, a foaming agent of Eiwa Chemical Ind. Co., Ltd.) and 4 parts by weight of a foam stabilizer (FL-21 of Adeka Argus Chemical Co., Ltd.) were mixed, coated onto release paper to give a thickness of 1 mm, and heated at 150° C. for 1 min to form a gelled sheet, which was expanded in a hot (200° C.) atmosphere to obtain a foam 5 mm thick that was within the scope of the present invention.

EXAMPLE 12

The procedure of Example 11 was repeated except that the amounts of trixylenyl phosphate (TXP of Daihachi Chemical Industry Co., Ltd.), dimethylcyclohexyl phthalate (EDENOL 344 of Henkel Hakusui Corporation) and di-2-ethylhexyl phthalate (VINYCIZER 80 of Kao Corp.) were respectively changed to 60, 20 and 0 parts by weight. As a result, a resin sheet and a foam that were within the scope of the present invention were obtained.

EXAMPLE 13

A resin sheet was formed by repeating the procedure of Example 8 except that 6.5 parts by weight of an azo compound (AC#R, a foaming agent of Eiwa Chemical Ind. Co., Ltd.) and 4 parts by weight of a foam stabilizer (FL-21 of Adeka Argus Chemical Co., Ltd.) were added to the recipe of formulation. The rolled sheet was pressed to form a flat sheet 1 mm thick, which was expanded in a hot (200° C.) atmosphere to make a foam 5 mm thick that was within the scope of the present invention.

COMPARATIVE EXAMPLE 7

The procedure of Example 11 was repeated except that the amounts of trixylenyl phosphate, dimethylcyclohexyl phthalate and di-2-ethylhexyl phthalate were respectively changed to 0, 0 and 70 parts by weight. As a result, a resin sheet and a foam that were outside the scope of the present invention were obtained.

EVALUATION OF LOSS TANGENT (TAN $\delta$)

The sheets prepared in Examples 1-4 and 10-13 and those prepared in Comparative Examples 1-3 and 7, all 1 mm thick, were measured for loss tangent (tan $\delta$) with a dynamic viscoelasticity measuring instrument (RHEOVIBRON DDV-III of Orientec Corporation). The conditions of the measurement were as follows: frequency, 110 Hz; rate of temperature elevation, 1° C./min. Maximum values of loss tangent and the temperatures at which those values occurred are shown in Tables 1 and 3.

The sheets prepared in Examples 5-9 and Comparative Examples 4-6, all 0.2 mm thick, were subjected to the measurement of maximum values of loss tangent (tan $\delta$) and the temperature ranges in which loss tangents of at least 0.5 were observed. The measurement was conducted with a viscoelasticity analyzer RSAII (Rheometrics Far East, Ltd.) which operated on the principle of a non-resonant, forced vibration method. The conditions of the measurement were as follows: frequency, 10 Hz; rate of temperature elevation, 2° C./min. The results are shown in Table 2.

EVALUATION OF BLEEDING

The sheets prepared in Examples 1-4 and Comparative Examples 1-3 were left to stand in a thermostatic chamber at 23° C. and 50% RH. Thereafter, the sheets were visually checked for the occurrence of bleeding. The results are shown in Table 1, together with the time period that lapsed before detectable bleeding occurred. The samples were labeled "negative" when no detectable bleeding occurred even after the passage of six months.

MEASURING THE IMPACT ABSORBING ABILITY OF FOAMS

A rubber sheet 3 mm thick was spread over an iron plate 30 mm thick and each of the foams prepared in Examples 10-13 and Comparative Example 7 was placed on top of the iron plate. A accelerometer (product of Brüel & Kjaer) was attached to the other side of the iron plate in the corresponding site. A steel ball weighing 388.7 g furnished with a force transducer (Brüel & Kjaer) was dropped from a height of 300 mm above the foam. The resulting impact acceleration was measured as a voltage with the accelerometer and the force transducer. The results are shown in Table 3.

As is clear from the foregoing description, the present invention offers a polyvinyl chloride based resin composition that experiences less bleeding and which exhibits a higher loss tangent on account of the use of a specified phosphoric acid ester in combination with a specified phthalic acid ester.

In accordance with the present invention, a vibration absorbing material is produced by compositing a polyvinyl chloride based resin with a petroleum resin, as well as a specified phthalate and phosphate ester. This absorbent has the advantage that the peak value of tan $\delta$ can be elevated to 1.5 or more, or that the temperature range in which tan $\delta$ shows values of at least 0.5 can be extended to a range as great as 50° C. or higher. Further, the absorbent will experience less bleeding.

As Table 3 shows, foams made of the vibration absorbing material of the present invention benefits from the fact that the skeletal resin has a very high tan $\delta$ which is at least 1.0. As a consequence, each of the two major factors of impact absorption, i.e., impact transmission (as detected with the accelerometer in terms of voltage) and impact damping (as detected with the force transducer in terms of voltage) can be improved by 20–60%.

TABLE 1

|  | Tan δ (max) | Temp. (°C.) | Bleeding | Time |
|---|---|---|---|---|
| Example 1 | 1.26 | 38 | negative | 6 mo. |
| Example 2 | 1.65 | 14 | negative | 6 mo. |
| Example 3 | 1.10 | 32 | negative | 6 mo. |
| Example 4 | 1.09 | 20 | negative | 6 mo. |
| Comparative Example 1 | 1.07 | 49 | positive | 20 d. |
| Comparative Example 2 | 0.83 | 40 | positive | 10 d. |
| Comparative Example 3 | 0.64 | 24 | positive | 7 d. |

TABLE 2

|  | Tan δ (max) | Temperature range |
|---|---|---|
| Example 5 | 2.38 | 40.5° C.–74.5° C. |
| Example 6 | 1.63 | 20.2° C.–52.9° C. |
| Example 7 | 1.69 | 20.7° C.–54.7° C. |
| Example 8 | 1.99 | 4.0° C.–40.9° C. |
| Example 9 | 0.89 | 14.7° C.–72.7° C. |
| Comparative Example 4 | 0.66 | −10.8° C.–17.9° C. |
| Comparative Example 5 | 1.18 | 6.6° C.–35.7° C. |
| Comparative Example 6 | 0.73 | 2.7° C.–27.5° C. |

TABLE 3

|  | Max tan δ and temperature | Voltage (max) on accelerometer | Voltage (max) on force transducer |
|---|---|---|---|
| Example 10 | 1.3 (38° C.) | 67 mV | 1.47 V |
| Example 11 | 1.1 (18° C.) | 117 mV | 2.28 V |
| Example 12 | 1.6 (27° C.) | 60 mV | 1.38 V |
| Example 13 | 1.9 (27° C.) | 57 mV | 1.29 V |
| Comparative Example 7 | 0.7 (8° C.) | 158 mV | 3.13 V |

What is claimed is:

1. A polyvinyl chloride based resin composition comprising 100 parts by weight of a polyvinyl chloride based resin, 10–100 parts by weight of a phthalic acid ester having the following structural formula (i), and 10–100 parts by weight of a phosphoric acid ester having the following structural formula (ii):

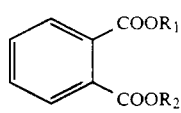 (i)

where $R_1$ and $R_2$ which may be the same or different each represents a monocyclic hydrocarbon group;

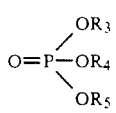 (ii)

where $R_3$, $R_4$ and $R_5$ which may be the same or different each represents an aromatic monocyclic hydrocarbon group.

2. A polyvinyl chloride based resin composition according to claim 1 wherein each of $R_1$ and $R_2$ in the formula (i) is a monocyclic hydrocarbon group having 6 carbon atoms.

3. A polyvinyl chloride based resin composition according to claim 1 wherein each of $R_3$, $R_4$ and $R_5$ in the formula (ii) is a substituted phenyl group.

4. A polyvinyl chloride based resin composition according to claim 1 wherein the phthalic acid ester of the formula (i) is dicyclohexyl phthalate.

5. A polyvinyl chloride based resin composition according to claim 1 wherein the phthalic acid ester of the formula (i) is dimethylcyclohexyl phthalate.

6. A polyvinyl chloride based resin composition according to claim 1 wherein the phosphoric acid ester of the formula (ii) is trixylenyl phosphate.

7. A polyvinyl chloride based resin composition according to claim 4 wherein the phosphoric acid ester of the formula (ii) is trixylenyl phosphate.

8. A polyvinyl chloride based resin composition according to claim 5 wherein the phosphoric acid ester of the formula (ii) is trixylenyl phosphate.

9. A material for absorbing vibrational energy that comprises the composition of claim 1.

10. A material for absorbing vibrational energy that comprises the composition of claim 7.

11. A material for absorbing vibrational energy that comprises the composition of claim 8.

12. A material for absorbing vibrational energy that comprises a polyvinyl chloride based resin, a petroleum resin, said petroleum resin containing at least 50 wt % of indene and styrene, and a plasticizer, said petroleum resin being contained in an amount of 3–200 parts by weight be 100 parts by weight of the polyvinyl chloride based resin, wherein the plasticizer consists of a phthalic acid ester and a phosphoric acid ester that respectively have the following structural formula (i) and (ii):

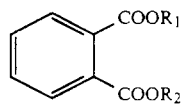 (i)

where $R_1$ and $R_2$ which may be the same or different each represents a monocyclic hydrocarbon group:

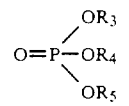 (ii)

where $R_3$, $R_4$ and $R_5$ which may be the same or different each represents an aromatic monocyclic hydrocarbon group, wherein said phthalic acid ester is present in an amount of 10–100 parts by weight per 100 parts by weight of said polyvinyl chloride based resin and wherein said phosphoric acid ester is present in an amount of 10–100 parts by weight per 100 parts by weight of said polyvinyl chloride based resin.

13. A material for absorbing vibrational energy according to claim 12 wherein the phthalic acid ester of the formula (i) is dicyclohexyl phthalate and the phosphoric acid ester of the formula (ii) is trixylenyl phosphate.

14. A material for absorbing vibrational energy according to claim 12 wherein the phthalic acid ester of the formula (i) is dimethylcyclohexyl phthalate and the phosphoric acid ester of the formula (ii) is trixylenyl phosphate.

15. A polyvinyl chloride based resin composition according to claim 1, wherein $R_1$ and $R_2$ which may be the same or different, each represents a monocyclic hydrocarbon group having 3-8 carbon atoms and $R_3$, $R_4$, and $R_5$, each of which may be the same or different, each represents an aromatic monocyclic hydrocarbon group having 6-9 carbon atoms.

16. A material for absorbing vibrational energy according to claim 12, wherein $R_1$ and $R_2$ which may be the same or different, each represents a monocyclic hydrocarbon group having 3-8 carbon atoms and $R_3$, $R_4$, and $R_5$, each of which may be the same or different, each represents an aromatic monocyclic hydrocarbon group having 6-9 carbon atoms.

* * * * *